Oct. 16, 1962 — W. HOFFMANN — 3,058,415
RECORDING APPARATUS
Filed Nov. 25, 1959 — 14 Sheets-Sheet 2
FIG. 2
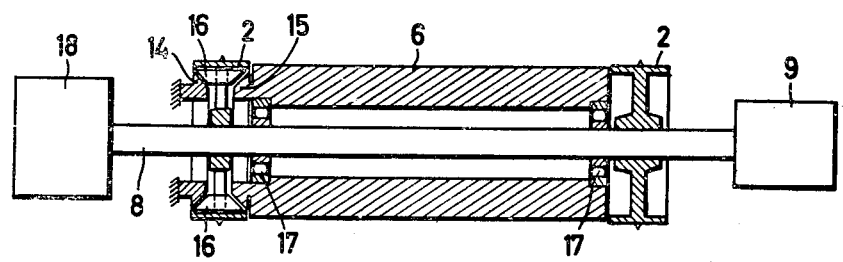
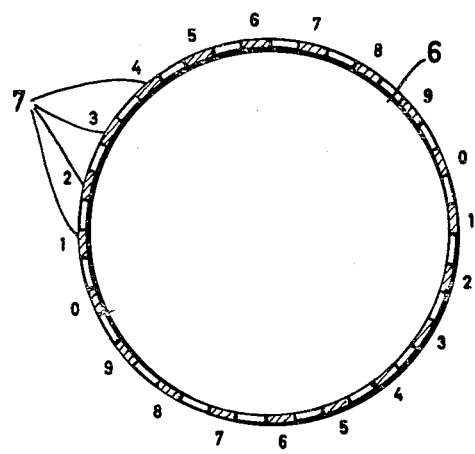
FIG. 3

Oct. 16, 1962    W. HOFFMANN    3,058,415
RECORDING APPARATUS

Filed Nov. 25, 1959    14 Sheets-Sheet 5

FIG.5a

Position letters

| Time-position | A | B | C | D | E | F | G | H | I | J |
|---|---|---|---|---|---|---|---|---|---|---|
| (1) | 1⁺<br>3 0<br>o b | 0⁺<br>7<br>a | 9˙ | 8˙ | 7˙ | 6˙ | 5˙ | 4˙ | 3˙ | 2˙ | 1˙ | 0˙ |
| (2) | 2⁺<br>6 3<br>d o | 1⁺<br>0 7<br>b a | 0⁺ | 9˙ | 8˙ | 7˙ | 6˙ | 5˙ | 4˙ | 3˙ | 2˙ | 1˙ |
| (3) | 3⁺<br>2 6<br>e d | 2⁺<br>3 0 7<br>o b a | 1⁺ | 0⁺ | 9˙ | 8˙ | 7˙ | 6˙ | 5˙ | 4˙ | 3˙ | 2˙ |
| (4) | 4⁺<br>1 2<br>f e | 3⁺<br>6 3 0 7<br>d o b a | 2⁺ | 1⁺ | 0⁺ | 9˙ | 8˙ | 7˙ | 6˙ | 5˙ | 4˙ | 3˙ |
| (5) | 5⁺<br>5 1<br>g f | 4⁺<br>2 6 3 0 7<br>e d ⓒ b a | 3⁺ | 2⁺ | 1⁺ | 0⁺ | 9˙ | 8˙ | 7˙ | 6˙ | 5˙ | 4˙ |
| (6) | 6⁺<br>0 5<br>h g | 5⁺<br>1 2 6 3 0 7<br>f e d o b a | 4⁺ | 3⁺ | 2⁺ | 1⁺ | 0⁺ | 9˙ | 8˙ | 7˙ | 6˙ | 5˙ |
| (7) | 7⁺<br>8 0<br>i h | 6⁺<br>5 1 2 6 3 0 7<br>g f e d o b a | 5⁺ | 4⁺ | 3⁺ | 2⁺ | 1⁺ | 0⁺ | 9˙ | 8˙ | 7˙ | 6˙ |
| (8) | 8⁺<br>2 8<br>j i | 7⁺<br>0 5 1 2 6 3 0 7<br>h g f e d o b a | 6⁺ | 5⁺ | 4⁺ | 3⁺ | 2' | 1⁺ | 0⁺ | 9˙ | 8˙ | 7˙ |
| (9) | 9⁺<br>0 2<br>k j | 8⁺<br>8 0 5 1 2 6 3 0 7<br>ⓒ h g f e d o b a | 7⁺ | 6⁺ | 5⁺ | 4⁺ | 3⁺ | 2⁺ | 1⁺ | 0⁺ | 9˙ | 8˙ |
| (10) | 0˙<br>1 0<br>l k | 9⁺<br>2 8 0 5 1 2 6 3 0 7<br>j i h g f e ⓓ o b a | 8⁺ | 7⁺ | 6⁺ | 5⁺ | 4⁺ | 3⁺ | 2⁺ | 1⁺ | 0⁺ | 9˙ |
| (11) | 1˙<br>1 1<br>m l | 0˙<br>0 2 8 0 5 1 2 6 3 0 7<br>ⓚ j i h g f e d o b a | 9⁺ | 8⁺ | 7⁺ | 6⁺ | 5⁺ | 4⁺ | 3⁺ | 2⁺ | 1⁺ | 0⁺ |
| (12) | 2˙<br>7 1<br>n m | 1˙<br>1 0 2 8 0 5 1 2 6 3 0 7<br>ⓛ k j i h g f e d o b a | 0˙ | 9⁺ | 8⁺ | 7⁺ | 6⁺ | 5⁺ | 4⁺ | 3⁺ | 2⁺ | 1⁺ |
| (13) | 3˙<br>9 7<br>o n | 2˙<br>1 1 0 2 8 0 5 1 2 6 3 0 7<br>m l k j i h g f e d o b a | 1˙ | 0˙ | 9⁺ | 8⁺ | 7⁺ | 6⁺ | 5⁺ | 4⁺ | 3⁺ | 2⁺ |

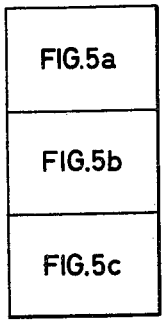

FIG.5

| FIG.5a |
| FIG.5b |
| FIG.5c |

Oct. 16, 1962     W. HOFFMANN     3,058,415
RECORDING APPARATUS
Filed Nov. 25, 1959     14 Sheets-Sheet 6

FIG.5b

```
Time-          A  B  C  D  E  F  G  H  I  J
position
               4° 3° 2° 1° 0° 9⁺ 8⁺ 7⁺ 6⁺ 5⁺ 4⁺ 3⁺
 (14)          5 9 7 1 1 0 2 8 0 5 1 2 6 3 0 7
               p o n m l k j i ⓗ g f e d c b a 5° 4° 3° 2° 1° 0° 9⁺ 8⁺ 7⁺ 6⁺ 5⁺ 4⁺
 (15)          5 5 9 7 1 1 0 2 8 0 5 1 2 6 3 0 7
               q p o n m l k j i h g f e d c b ⓐ

6° 5° 4° 3° 2° 1° 0° 9⁺ 8⁺ 7⁺ 6⁺ 5⁺
 (16)          3 5 5 9 7 1 1 0 2 8 0 5 1 2 6 3 0 7
               r q ⓞ o n m l k ⓙ i h g f e d c b a

7° 6° 5° 4° 3° 2° 1° 0° 9⁺ 8⁺ 7⁺ 6⁺
 (17)          6 3 5 5 9 7 1 1 0 2 8 0 5 1 2 6 3 0 7
               s r q p o n m l k j i h g f e d c b a

8° 7° 6° 5° 4° 3° 2° 1° 0° 9⁺ 8⁺ 7⁺
 (18)          4 6 3 5 5 9 7 1 1 0 2 8 0 5 1 2 6 3 0 7
               t s r q p o n m l k j i h g ⓕ e d c b a

9° 8° 7° 6° 5° 4° 3° 2° 1° 0° 9⁺ 8⁺
 (19)            4 6 3 5 5 9 7 1 1 0 2 8 0 5 1 2 6 3 0 7
               t s r q p o n m l k j i h g f e d c b a

0⁺ 9° 8° 7° 6° 5° 4° 3° 2° 1° 0° 9⁺
 (20)            4 6 3 5 5 9 7 1 1 0 2 8 0 5 1 2 6 3 0 7
               t s r q p o n m l k j i h g f e d c ⓑ a

1⁺ 0⁺ 9° 8° 7° 6° 5° 4° 3° 2° 1° 0°
 (21)            4 6 3 5 5 9 7 1 1 0 2 8 0 5 1 2 6 3 0 7
               t s r q p o n m l k j i h g f ⓔ d c b a

2⁺ 1⁺ 0⁺ 9° 8° 7° 6° 5° 4° 3° 2° 1°
 (22)            4 6 3 5 5 9 7 1 1 0 2 8 0 5 1 2 6 3 0
               t s r q p o ⓝ m l k j i k g f e d c b

3⁺ 2⁺ 1⁺ 0⁺ 9° 8° 7° 6° 5° 4° 3° 2°
 (23)            4 6 3 5 5 9 7 1 1 0 2 8 0 5 1 2 6 3
               t s r q p o n m l k j i h g f e d c

4⁺ 3⁺ 2⁺ 1⁺ 0⁺ 9° 8° 7° 6° 5° 4° 3°
 (24)            4 6 3 5 5 9 7 1 1 0 2 8 0 5 1 2 6
               t s r q p o n m l k j i h g f e d

5⁺ 4⁺ 3⁺ 2⁺ 1⁺ 0⁺ 9° 8° 7° 6° 5° 4°
 (25)            4 6 3 5 5 9 7 1 1 0 2 8 0 5 1 2
               t s r q p ⓞ n m l k j i h ⓖ f e

6⁺ 5⁺ 4⁺ 3⁺ 2⁺ 1⁺ 0⁺ 9° 8° 7° 6° 5°
 (26)            4 6 3 5 5 9 7 1 1 0 2 8 0 5 1
               t s r q p o n m l k j i h g f
```

Oct. 16, 1962 W. HOFFMANN 3,058,415
RECORDING APPARATUS
Filed Nov. 25, 1959 14 Sheets-Sheet 7

FIG.5c

| Time-position | A | B | C | D | E | F | G | H | I | J |
|---|---|---|---|---|---|---|---|---|---|---|
| (27) | 7⁺ | 6⁺ | 5⁺ | 4⁺ | 3⁺ | 2⁺ | 1⁺ | 0⁺ | 9˙ | 8˙ | 7˙ 6˙ |
|  |  |  |  |  | 4 6 3 5 5 9 7 1 1 0 2 8 0 5 |
|  |  |  |  |  | t s r q p o n m l k j i h g |
| (28) | 8⁺ | 7⁺ | 6⁺ | 5⁺ | 4⁺ | 3⁺ | 2⁺ | 1⁺ | 0⁺ | 9˙ 8˙ 7˙ |
|  |  |  |  |  | 4 6 3 5 5 9 7 1 1 0 2 8 0 |
|  |  |  |  |  | t s r q p o n m l k j i h |
| (29) | 9⁺ | 8⁺ | 7⁺ | 6⁺ | 5⁺ | 4⁺ | 3⁺ | 2⁺ | 1⁺ | 0⁺ 9˙ 8˙ |
|  |  |  |  |  | 4 6 3 5 5 9 7 1 1 0 2 8 |
|  |  |  |  |  | t s r q p o n m l k j i |
| (30) | 0˙ | 9⁺ | 8⁺ | 7⁺ | 6⁺ | 5⁺ | 4⁺ | 3⁺ | 2⁺ | 1⁺ 0⁺ 9˙ |
|  |  |  |  |  | 4 6 3 5 5 9 7 1 1 0 2 |
|  |  |  |  |  | ⓣ s ⓡ q p o n m l k j |
| (31) | 1˙ | 0˙ | 9⁺ | 8⁺ | 7⁺ | 6⁺ | 5⁺ | 4⁺ | 3⁺ | 2⁺ 1⁺ 0⁺ |
|  |  |  |  |  | 4 6 3 5 5 9 7 1 1 0 |
|  |  |  |  |  | t s r q p o n ⓜ l k |
| (32) | 2˙ | 1˙ | 0˙ | 9⁺ | 8⁺ | 7⁺ | 6⁺ | 5⁺ | 4⁺ | 3⁺ 2⁺ 1⁺ |
|  |  |  |  |  | 4 6 3 5 5 9 7 1 1 |
|  |  |  |  |  | t s r q p o n m l |
| (33) | 3˙ | 2˙ | 1˙ | 0˙ | 9⁺ | 8⁺ | 7⁺ | 6⁺ | 5⁺ | 4⁺ 3⁺ 2⁺ |
|  |  |  |  |  | 4 6 3 5 5 9 7 1 |
|  |  |  |  |  | t s r q p o n m |
| (34) | 4˙ | 3˙ | 2˙ | 1˙ | 0˙ | 9⁺ | 8⁺ | 7⁺ | 6⁺ | 5⁺ 4⁺ 3⁺ |
|  |  |  |  |  | 4 6 3 5 5 9 7 |
|  |  |  |  |  | t s r q p o n |
| (35) | 5˙ | 4˙ | 3˙ | 2˙ | 1˙ | 0˙ | 9⁺ | 8⁺ | 7⁺ | 6⁺ 5⁺ 4⁺ |
|  |  |  |  |  | 4 6 3 5 5 9 |
|  |  |  |  |  | ⁎ ⓢ r ⓠ p o |
| (36) | 6˙ | 5˙ | 4˙ | 3˙ | 2˙ | 1˙ | 0˙ | 9⁺ | 8⁺ | 7⁺ 6⁺ 5⁺ |
|  |  |  |  |  | 4 6 3 5 5 |
|  |  |  |  |  | t s r q p |
| (37) | 7˙ | 6˙ | 5˙ | 4˙ | 3˙ | 2˙ | 1˙ | 0˙ | 9⁺ | 8⁺ 7⁺ 6⁺ |
|  |  |  |  |  | 4 6 3 5 |
|  |  |  |  |  | t s r q |
| (38) | 8˙ | 7˙ | 6˙ | 5˙ | 4˙ | 3˙ | 2˙ | 1˙ | 0˙ | 9⁺ 8⁺ 7⁺ |
|  |  |  |  |  | 4 6 3 |
|  |  |  |  |  | t s r |
| (39) | 9˙ | 8˙ | 7˙ | 6˙ | 5˙ | 4˙ | 3˙ | 2˙ | 1˙ | 0˙ 9⁺ 8⁺ |
|  |  |  |  |  | 4 6 |
|  |  |  |  |  | t s |
| (40) | 0⁺ | 9˙ | 8˙ | 7˙ | 6˙ | 5˙ | 4˙ | 3˙ | 2˙ | 1˙ 0˙ 9⁺ |
|  |  |  |  |  | 4 |
|  |  |  |  |  | t |

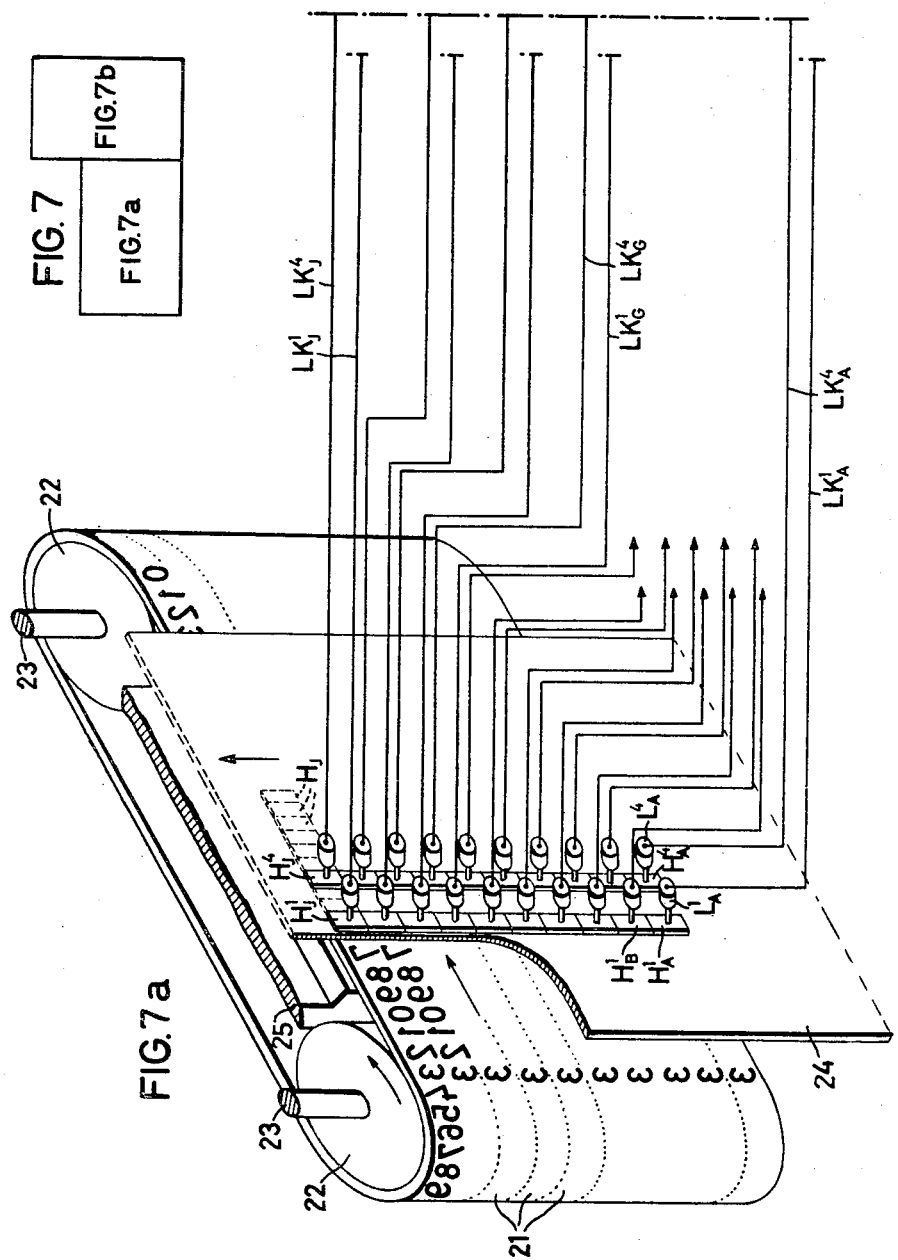

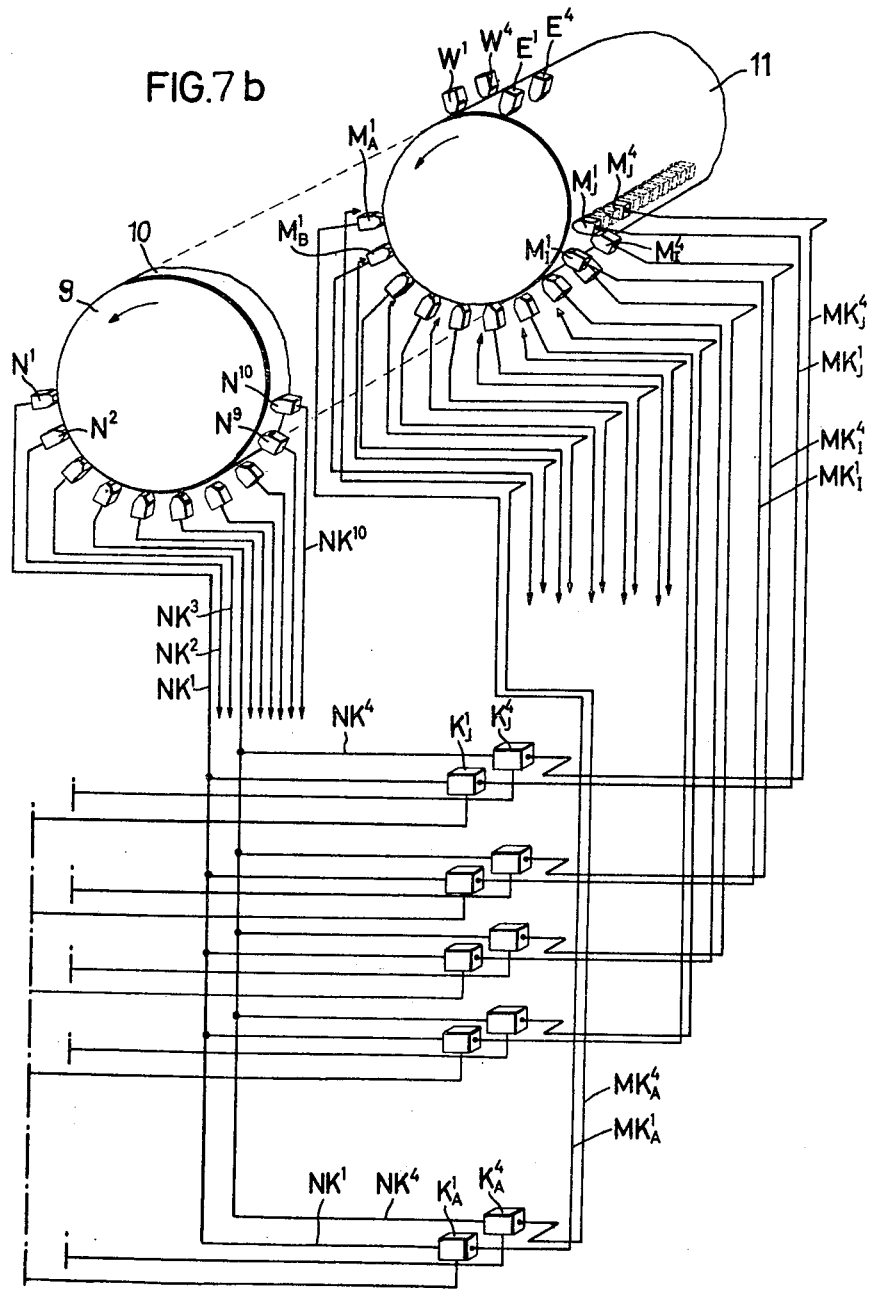

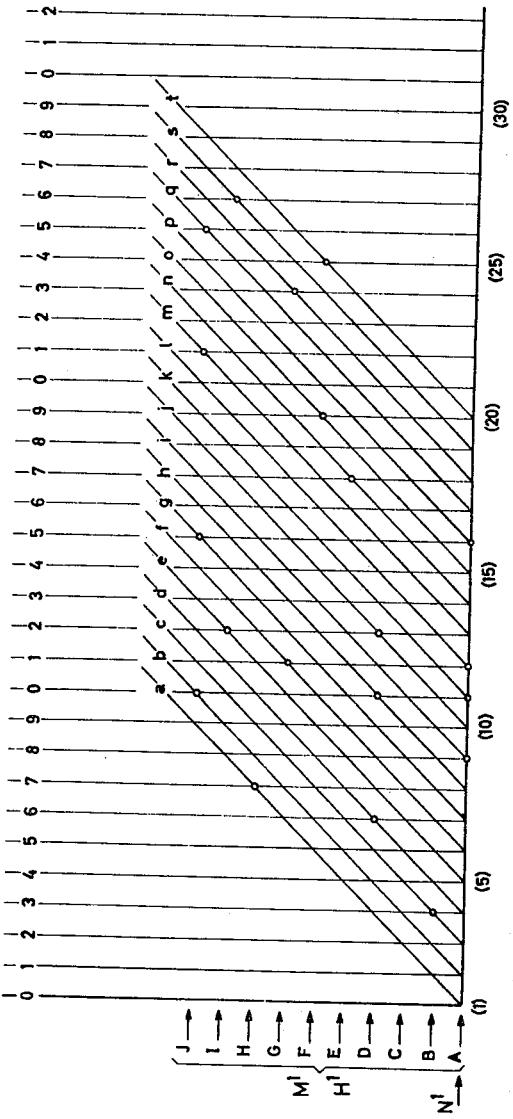

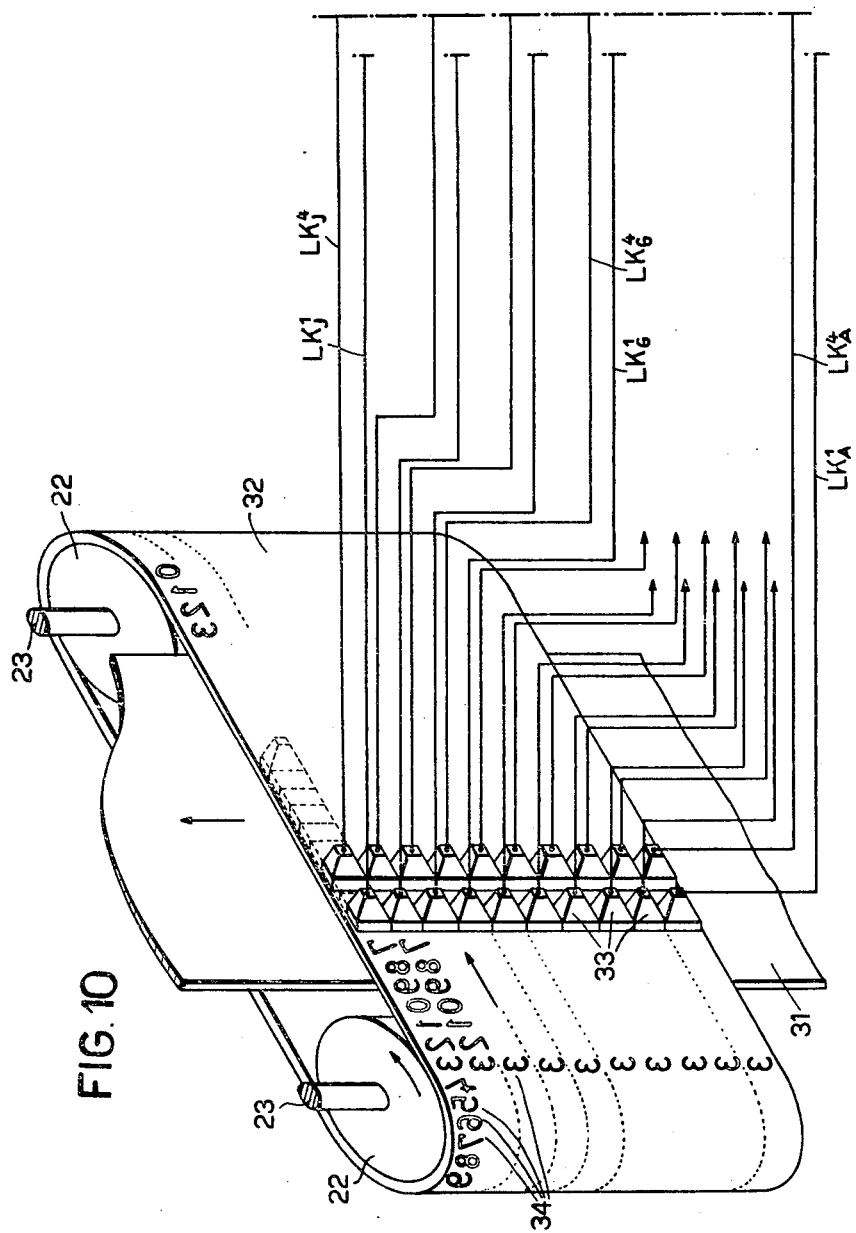

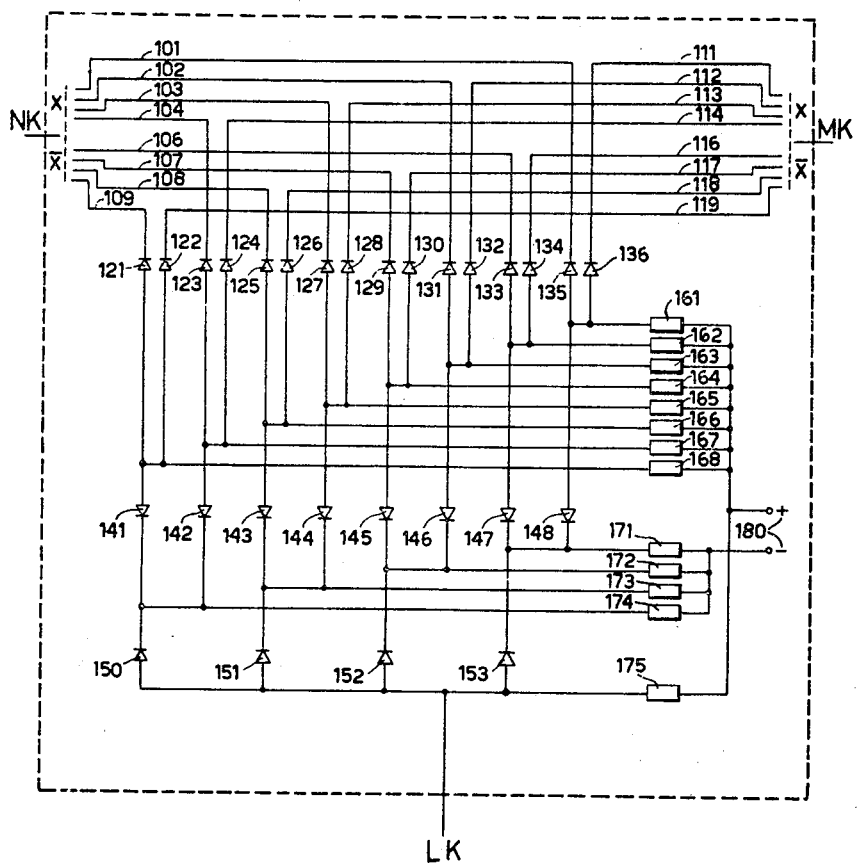

United States Patent Office 3,058,415
Patented Oct. 16, 1962

3,058,415
RECORDING APPARATUS
Walter Hoffmann, Adliswil, Zurich, Switzerland, assignor to International Business Machines Corporation, New York, N.Y., a corporation of New York
Filed Nov. 25, 1959, Ser. No. 855,452
Claims priority, application Switzerland Dec. 1, 1958
5 Claims. (Cl. 101—93)

This invention relates to recording apparatus and more particularly recording apparatus of the record-controlled type for producing permanent visual records of alphabetic, numeric, or special characters upon a record receiving medium.

Numerical, alphabetical and special characters or marks which are handled in coded form in digital computing devices or, more general, in information-processing machines, in most cases, must be recorded in readable form for the operator, when the information-handling process is finished. For this purpose, printing devices are, for instance, in use, which are called "one-line at a time" printing systems. A well known "one-line at a time" printer is the "wheel and hammer" printer. This printer operates in that the symbols to be printed are secured in the form of letter and number types to the circumference of a rotating type wheel. The type wheel has as many lines of letter and number types as there are provided different alphanumerical characters or symbols. Each line of the type wheel contains symbols of the same type only. Paper to be printed upon, together with the ribbon, is passed through one-line printing positions. At each one-line printing position, a set of individually movable hammers are employed which are arranged along a single line. The hammers can be selectively operated to strike against the paper, the ribbon and the type wheel.

It is a disadvantage of the one-line at a time wheel and hammer printers as used at present that for every line to be printed the type wheel has to make a complete revolution, since only in that manner can all the different symbols around the periphery of the type wheel be reviewd to determine which of them is required for printing in the distinct position of the printing line. Hence another disadvantage is that continuous paper feeding is not possible. The paper record sheet must always be stopped in printing position during each revolution of the type wheel. The speed, which can be achieved at present with alphanumerical one-line at a time wheel and hammer printers, is between 10 and 15 printing lines per second. If, for example, a line contains 120 printing positions, the maximum achievable output speed is between 1200 and 1800 characters per second.

The present invention overcomes the above disadvantages because there is no stopping of the record sheet during printing of individual lines and printing takes place simultaneously on several lines.

It is therefore an object of the present invention to provide a recording device in which the record medium is continuously movable, that is a recording device where the record medium is not started and stopped for the printing of each individual line.

It is a further object of the present invention to provide a recording device in which, as compared with the printers known in the art, the mechanical parts are operated at uniform velocity and thus the wear of the mechanical parts is not increased.

A further object of the instant invention is to provide a recording apparatus wherein both the individual character recording elements and the record-receiving member are continuously moved at uniform but different velocities so that each different character recording element is presented to each of predetermined given areas of the record-receiving medium.

An even further object of the instant invention is to achieve the foregoing object by providing an apparatus wherein the record-receiving medium and the character recording elements move in the same direction but wherein the velocity of the character elements is greater than that of the record-receiving medium.

Yet another object is to provide a recording apparatus wherein the relative motion between the character recording elements and the record receiving medium is orthogonal and is so arranged that each different character recording element is presented to each of predetermined given areas of the record-receiving medium.

Another object of the invention is to provide a recording apparatus wherein a plurality of different matrical arrays of record producing elements is successively aligned with a plurality of different matrical arrays of discrete record receiving areas of a record medium and a matrix of record transfixing means is actuated by a timing means which energizes the individual elements constituting the matrix so as to transfix a given record in a given discrete area under control of coded input data.

A supplementary object is to provide a recording apparatus in accordance with the preceding object wherein both the matrical arrays of record producing elements and the record receiving medium are both in uniform motion and the record transfixing is achieved when a given record element is aligned with a given discrete record area.

An additional object of the invention is to provide a recording apparatus having a constantly moving record-receiving medium and a constantly moving array of different record producing elements, wherein codal input data manifestive of a line of data characters to be transfixed on a given line of said record receiving medium is recorded on a moving record medium upon which is permanently recorded a succession of codal data manifestive of each different record producing element in said array arranged in the same order, the said record medium being movable synchronously with said record-receiving medium past an array of codal receiving elements which detect both the coded input data and the coded character data and upon a comparison thereof effect a transfixation of a character upon the record medium.

The printing device according to this invention comprises a record medium to receive a printed information and an arrangement of print characters having a given number of different symbols. The print characters are arranged in sets, each set including one of each of said different symbols. There is provided according to the invention a driving means to continuously move said record medium with respect to and across a two-dimensional array comprising at least a part of said print characters of said arrangement and such that a plurality of print lines thereof simultaneously are located opposite and in close proximity to the print characters of said array and wherein said sets are disposed in such a manner that there is offered to each print position of said plurality of print lines during their passage alongside said array each of said different symbols a single time, there being provided for the print characters of said array a print effecting means which enables selective printing of the print characters.

The foregoing and other objects, features and advantages of the invention will be apparent from the following more particular description of preferred embodiments of the invention, as illustrated in the accompanying drawings.

In the drawings:

FIGURE 2 shows the differential drive mechanism to achieve a speed ratio of 1:2.

FIGURE 3 shows the distribution of the twenty number type lines across the periphery of the type wheel.

Figure 1:
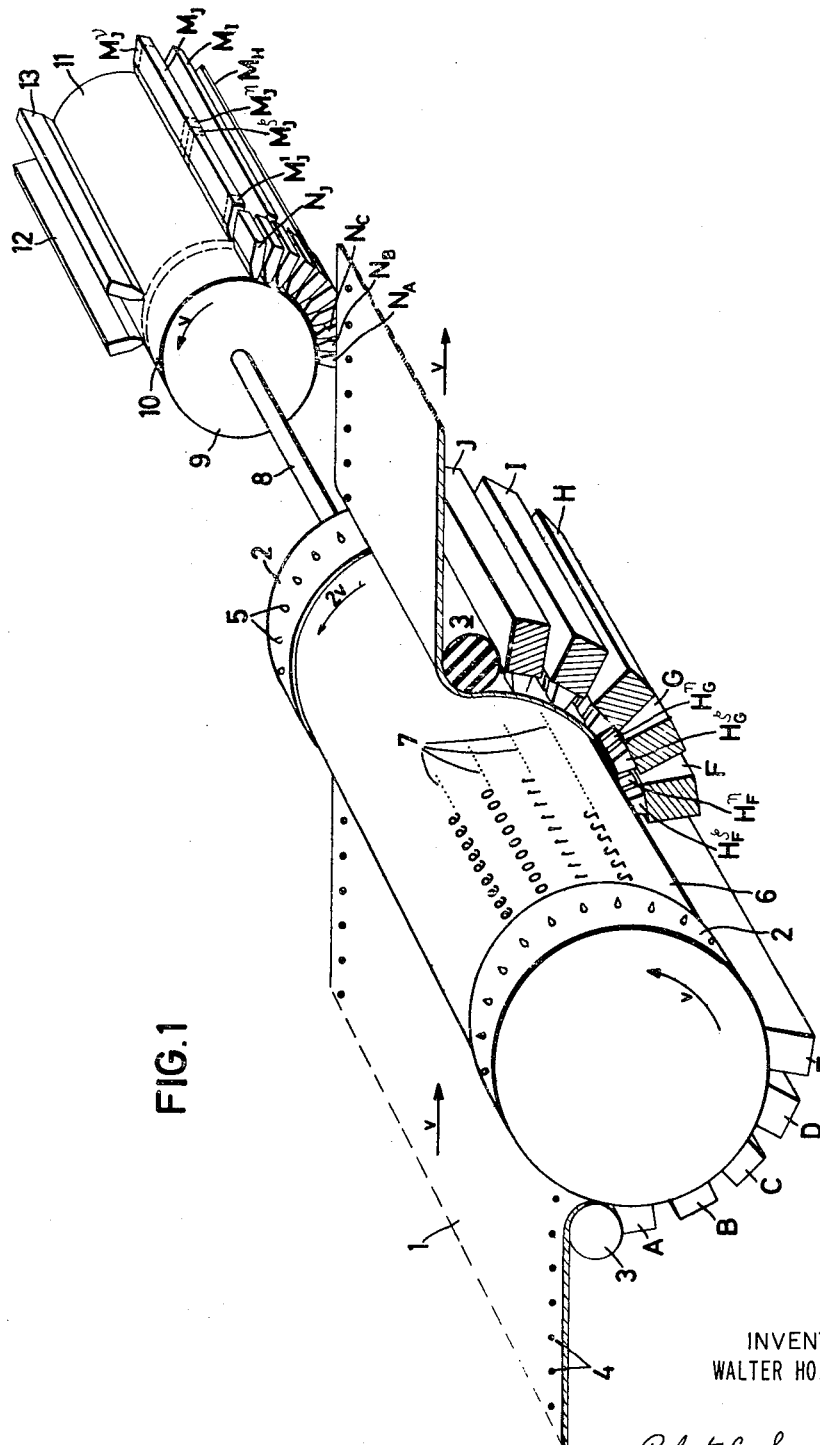
FIGURE 1 is a perspective view of the general type of a multi-line at a time wheel and hammer printer according to the present invention.
Figure 4:
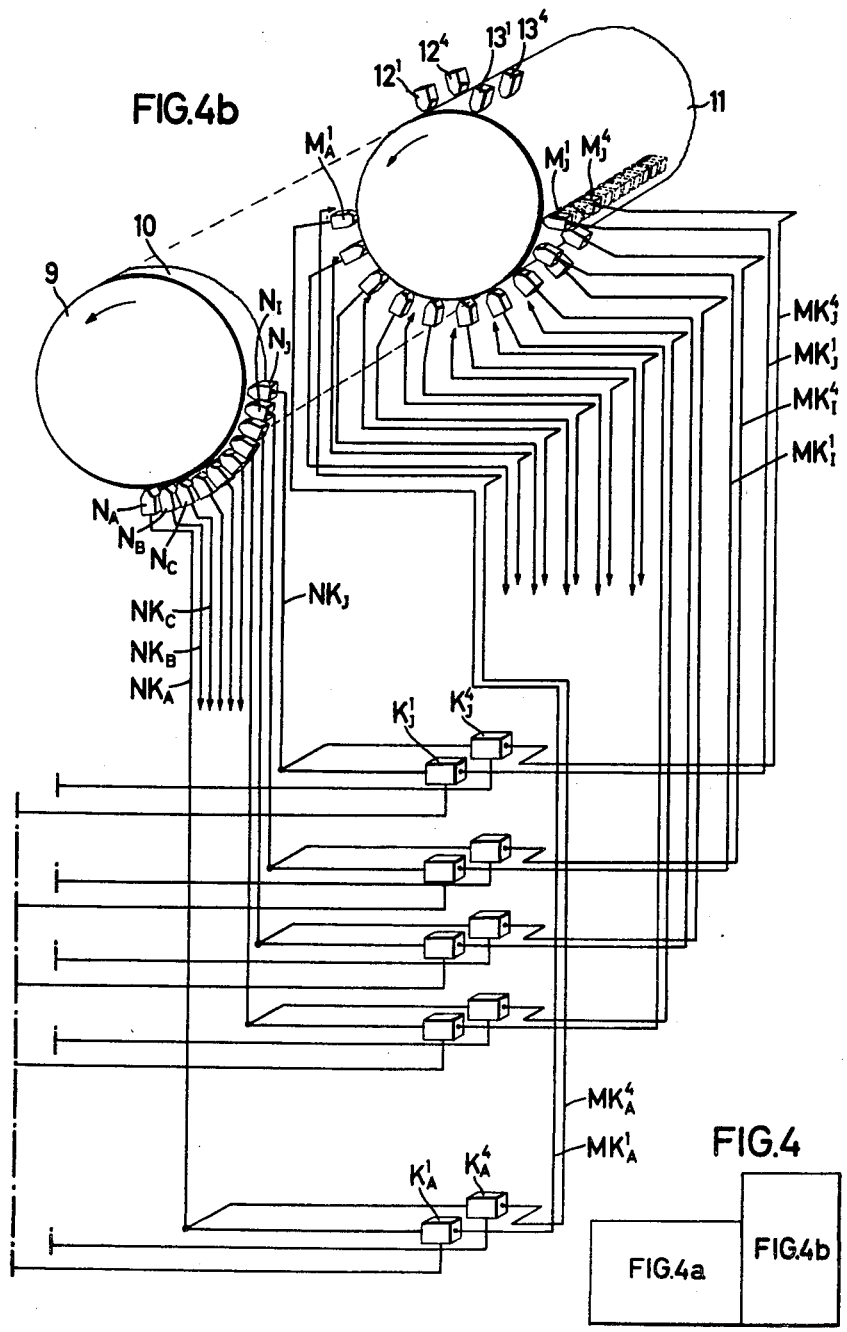

FIGURE 4, which consists of FIGURE 4a and FIGURE 4b, shows the wiring diagram and a more detailed representation of the printer of FIGURE 1.

Figure 5:
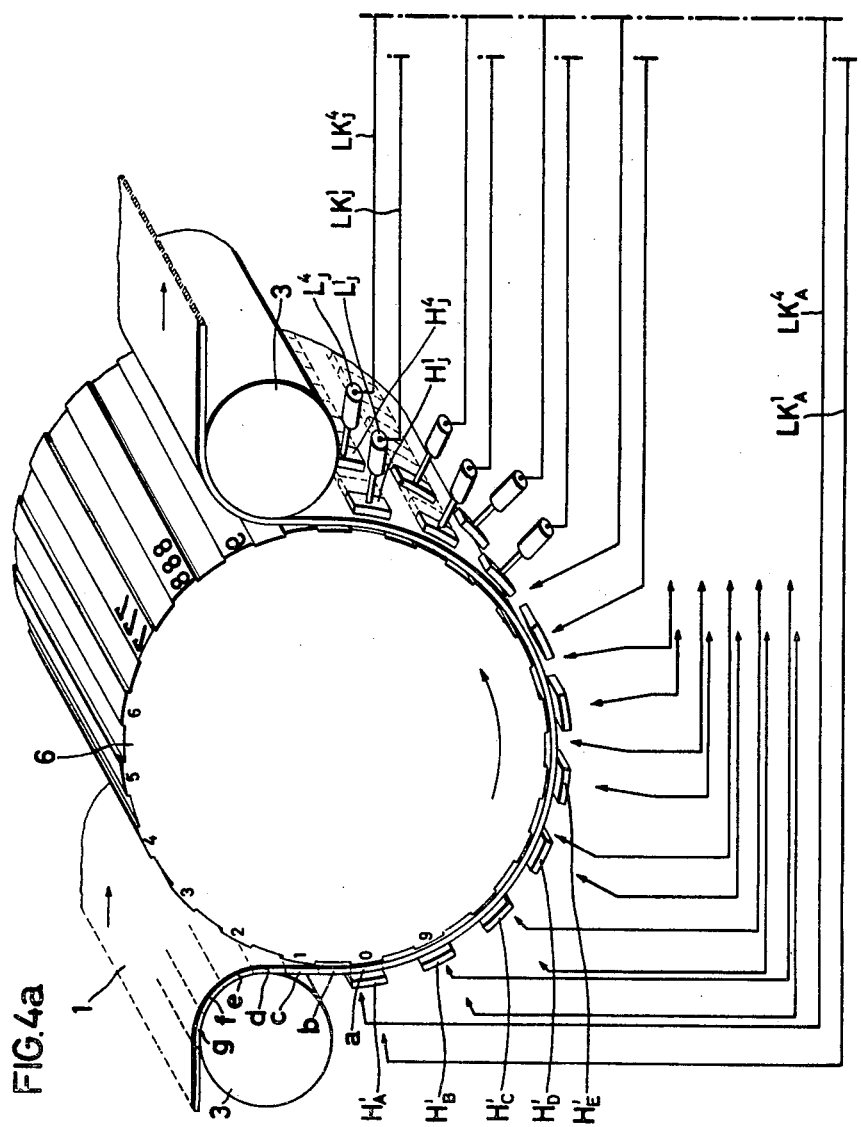

FIGURE 5, consisting of FIGURES 5a, 5b and 5c, and FIGURE 6 show timing diagrams.

FIGURES 7a and 7b comprise a perspective view of another embodiment of a printer according to the present invention.

Figure 9:
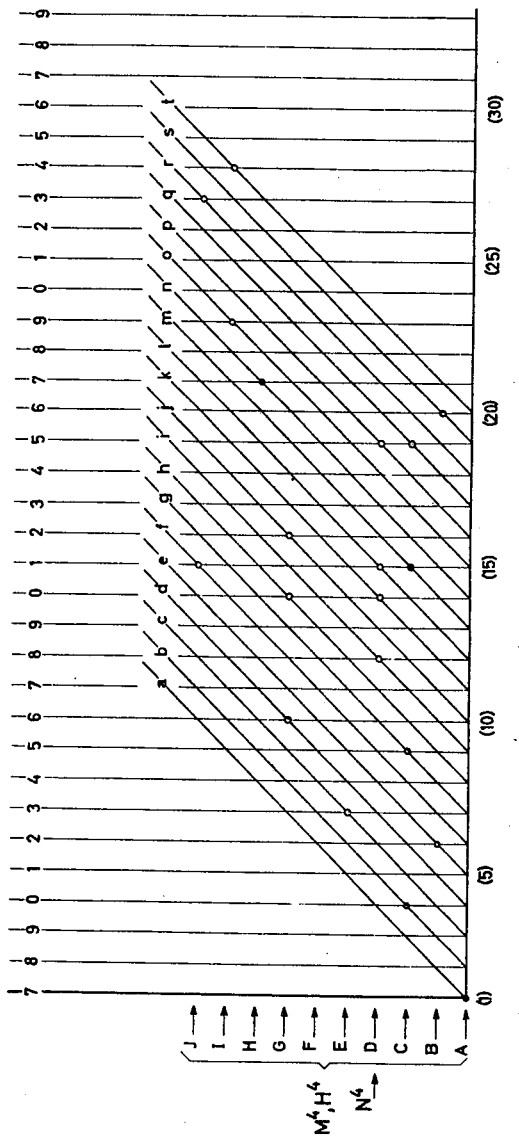

FIGURES 8 and 9 are timing diagrams serving to explain the operation of the printer of FIGURE 7.

FIGURE 10 shows a perspective view of the printer section of another embodiment of the present invention.

FIGURE 11 shows the circuit of a coincidence device which may be employed in the examples described.

Referring to FIGURE 1, a high-speed printer of the wheel and hammer type is shown. The printer comprises a rotating type wheel 6 and two paper advancing drums 2. The type wheel 6 rotates twice as fast as the paper advancing drums 2; both rotate counterclockwise as indicated. The drive mechanism through which the desired rotational speed relation of 1:2 is achieved will be described later with reference to FIGURE 2.

A drum 9 with a magnetizable surface is connected to the paper advancing or feeding drums 2 by means of a shaft 8 which is driven continuously by a motor, not shown. The magnetic drum 9 and the paper advancing drums 2 have the same rotational speed.

A paper record sheet 1 is fed around one-half of the surface of the type wheel 6 by means of guiding rolls 3 and the two paper advancing drums 2, the latter comprising a plurality of sprocket teeth 5. These teeth 5 grasp through carriage holes 4 placed along both sides of the record sheet 1. By this means, the record sheet 1 is advanced with the peripheral speed of the paper advancing drums 2.

For ease of understanding, only the ten numerical symbols 0 through 9 are assumed to be provided in the disclosed printing system, but this invention is not limited to this specific case, and it is believed to be obvious to the person skilled in the art to design alphanumerical or other printers with any desired number of different printing symbols on the bases of what is disclosed in the present description.

Referring again to FIGURE 1, the rotating type wheel 6 comprises, in the form of character type lines 7, a two-dimensional array of numerical symbols for printing. The single type lines extend axially across the cylindrical part of the type wheel. Each line contains type characters of the same kind only. In each line as many single character types are provided as desired print positions in the printing lines. In the printing system presently described twenty character lines 7 are distributed in equidistant spaces across the surface of the type wheel. Thus, the type wheel always contains two lines 7 of each of the ten numerical symbols 0 through 9 in opposite positions. In FIGURE 3, the distribution of the twenty number type lines across the circumference of the type wheel is shown.

Ten lines of print hammer sets A through J containing individually selectable print hammers H are fixed in equidistant spaces along the lower half of the circumference of the type wheel. In each of the ten hammer sets A through J as many hammers as there are printing positions in a printing line have to be provided. Generally, this number will be marked with the symbol $v$ and the hammers will be individually marked with $H_A^1$ through $H_A^v$, $H_B^1$ through $H_B^v$, $H_C^1$ through $H_C^v$, $H_D^1$ through $H_D^v$, $H_E^1$ through $H_E^v$, $H_F^1$ through $H_F^v$, $H_G^1$ through $H_G^v$, $H_H^1$ through $H_H^v$, $H_I^1$ through $H_I^v$ and $H_J^1$ through $H_J^v$. Altogether 10 times $v$ single hammers are to be provided.

Consecutive hammers $H_A$ through $H_J$ are always positioned in spaces of alternate print lines. Thus, nineteen consecutive print lines of the record sheet are located between the ten hammer print positions A through J along the lower half of the circumference of the type wheel 6. This arrangement has the advantage that the positioning of the consecutive hammer sets can be made twice as wide as is the distance between adjacent printing lines actually achieved on the record sheet. If a strike sensitive record sheet is used, no feeding of a ribbon is necessary. If a common paper sheet is used, an inked ribbon sheet must be provided. Such an inked ribbon sheet is not shown in FIGURE 1. It could, for instance, be arranged between the paper record sheet and the rotating type wheel 6 and might be moved in a similar way as is the record sheet.

The magnetic drum 9, which rotates counterclockwise with the same rotational speed as the paper advancing drums 2, is divided, in axial direction, into two sections. Referring also to FIGURE 4, and particularly to FIGURE 4b, the first section 10 contains forty magnetic code markings in equidistant spaces around its cylindrical part of the surface. These forty code markings are composed of four times ten different markings which are or correspond to the ten number symbols 0 through 9 of the type wheel 6 and which serve for the location detection of the character lines 7 (FIGURE 1) of said type wheel 6. The sequence of the code markings of the surface of section 10 must correspond to the sequence of the symbols of the character lines 7 of the type wheel 6 that is the numbers 0 through 9 consecutively. Ten magnetic reading heads $N_A$ through $N_J$, forming line location detecting devices, are placed in equidistant spaces across one quarter of the periphery of section 10. Thus, the distance between two of these reading heads N is equal to the distance between two code markings of section 10. Since the same kind of code marking is present four times on the drum surface 10, the code markings of the same kind are spaced 90 degrees apart, and it is obvious that the group of heads $N_A$ through $N_J$, in order to avoid tied package, could also be distributed around the whole circumference provided that their angular relationship to the respective code markings would remain unchanged.

The second section 11 of the magnetic drum 9 contains the information to be printed in the same code used for the code markings of section 10. The information to be printed will be written onto the magnetic drum 11 consecutively line by line by means of a set of single magnetic writing heads 12, the magnetic drum section 11 serving as an information storage device. The distance between two information lines of section 11 will be the same as the distance between two code markings of section 10. The information passes consecutively line by line ten sets of magnetic reading heads $M_A$ through $M_J$, which are placed in equidistant spaces across one half of the periphery of section 11. (In the perspective view of FIGURE 1, the sets $M_A$ to $M_G$ of the information reading heads cannot be seen.) Thus, the distance between two information reading heads M is twice as large as is the distance between two consecutive magnetic reading heads N. Single magnetic reading heads of section 11 are marked in accordance with the markings of the single hammers H, for example $M_A^1$ through $M_A^v$, $M_B^1$ through $M_B^v$, ... $M_J^1$ through $M_J^v$. There are as many reading heads M in one information reading line as there are printing positions in one line. This number has been defined with the symol $v$.

When an information line has passed all ten reading stations $M_A$ through $M_J$, the information will be erased by means of a set of erasing heads 13 or by a single erasing magnet. Thus, after passing erasing station 13, the lines are ready to obtain new information. It should be noted that correct alignment between the line indications of section 10 and the information lines of section 11 is of importance for reliable and correct operation of the printer. It is obvious that changes in the arrangement of the magnetic heads 12, 13, $N_A$ through $N_J$, $M_A$ through $M_J$ and in other parts of the system can be made. For example, the magnetic heads could be arranged in helical form across the whole periphery of the drum 9.

Reference is now made to FIGURE 2 which is a schematic diagram of the differential drive mechanism by means of which the desired rotational speed relation of 1:2 is achieved, which is necessary for driving the type wheel 6 twice as fast as the paper advancing drums 2. For this purpose, a differential mechanism is provided on the left side of the type wheel 6 as shown in FIGURE 2. Instead of an outside bevel gear, merely a toothed wheel ring 14 is used which is mounted fixed and does not rotate. The inside bevel gear 15 which has a hollow axis is rigidly fixed to the type wheel 6 which is loosely disposed on the driving shaft 8 by means of ball bearings 17. This driving shaft 8 is connected to the pinion gears 16 of the differential onto which the paper advancing drums 2 are mounted. Thus, the driving shaft 8 rotates the paper advancing drums 2 with the rotational speed which is derived from a motor 18, whereas the rotating speed of the type wheel 6 is twice as fast because it is driven by the bevel gears 15 which rotate, as is obvious, with double the speed of the driving shaft 8. The right end of this driving shaft 8 is connected directly to the magnetic drum 9 which rotates with the same rotational speed as the paper advancing drums 2.

FIGURE 3 shows the distribution of the twenty number type lines (marked 7 in FIGURES 1 and 3) across the periphery of the type wheel 6. Lines with equal characters are, with respect to the axis opposite to each other on the periphery.

FIGURE 4, which is divided into FIGURES 4a and 4b as shown, represents the wiring diagram for two columns, designated 1 and 4 of printing positions from which a complete comprehension of the whole wiring scheme is possible. A schematic view of the printer system is shown in FIGURE 4a. This printing system comprises the type wheel 6 with the marked type characters, the two paper guiding rolls 3, the paper record sheet 1 on which the single printing lines are marked with $a$, $b$, $c$, etc.

Across one half of the circumference of the type wheel 6, ten lines of print hammers $H_A$ through $H_J$ are provided for ten positions of printing lines. In FIGURE 4a, only a fraction of all the hammers in each line is shown, for example, in printing line position J, the two hammers $H_J^1$ and $H_J^4$. For the printing process, each print line of the record sheet 1 can be considered to be subdivided into individual print positions corresponding to the individual print characters or hammer positions. Each such print position defines the space which may receive the print of a single character. Actuating means L (for instance solenoids) belong to each of these hammers H. They are designated with index numbers in the same way as the hammers themselves. These actuating means L are connected through wires LK to corresponding coincidence devices K (FIG. 4b) which comprise electronic circuitry for comparing the signals read by corresponding reading heads M and N. Here the same index designation is also used. Upon coincidence, in a coincidence device K, an actuating signal is sent through the corresponding output wire LK to the corresponding actuating means L which operates the hammer H belonging to it.

FIG. 4b shows two columns (designated 1 and 4) of magnetic drum section 11 with the magnetic writing heads $12^1$, $12^4$, erasing heads $13^1$, $13^4$, and reading heads $M_A^1$ through $M_J^1$ and $M_A^4$ through $M_J^4$ which are connected by wires $MK_A^1$ to $MK_J^1$ and $MK_A^4$ to $MK_J^4$ respectively to the first inputs of related coincidence devices K. The second inputs of the coincidence devices K are connected through wires NK to the magnetic reading heads N which are arranged with the magnetic drum section 10 containing the type character indication code markings.

It is obvious in which way the wiring system has to be extended for the other columns. In order not to overload the FIG. 4 with connections, that is for the sake of clarity, the two columns 1 and 4 have been shown only.

The operation of the described printing system may be best understood by an explanation in which only one column position is discussed. The following designations shall be used: The twenty type wheel characters are marked with $0^-$, $1^-$, $2^-$, $3^-$, $4^-$, $5^-$, $6^-$, $7^-$, $8^-$, $9^-$, $0^+$, $1^+$, $2^+$, $3^+$, $4^+$, $5^+$, $6^+$, $7^+$, $8^+$ $9^+$. For the purpose of the present explanation, the ten hammers are designated with $H_A$ through $H_J$. The ten magnetic heads which sense the reference code markings of magnetic drum section 10 are designated $N_A$ through $N_J$. The ten magnetic heads which sense information to be printed and which are arranged with the magnetic drum section 11 are designated $M_A$ through $M_J$. The hammers and heads may for instance be those of the first column from left.

For the timing schedule the individual steps are designated with (1), (2), (3), etc. We assume in our example that, for instance, the following number pattern shall be printed in the first column from left. The pattern and the printing lines are coordinated as follows:

Pattern:  4 6 3 5 5 9 7 1 1 0 2 8 0 5 1 2 6 3 0 7
Line:     t s r q p o n m l k j i h g f e d c b a
$\longrightarrow$
Direction of advance The time interval during which the magnetic drum 9 rotates one turn is divided into forty cycle units (time positions). During one cycle unit each point of the magnetic drum section 10 moves a path length which is equal to the distance between two adjacent reading heads out of the group designated by $N_A$ through $N_J$. It should be noted that, since the circumferential distance of the heads belonging to the group $M_A$ through $M_J$ is twice the distance of the N-heads, it takes two cycle units <u>for</u> a point of the drum section 11 to move from one head to the adjacent one. Two cycle units are necessary until a printing line of the record sheet 1 has moved from one to the next hammer position. In one cycle unit the type characters 7 of the type wheel 6 reach the next hammer position.

Now, for the first five time positions or cycle units, the operation of the printer system will be analyzed in detail.

Time position (1): We suppose that at time position (1) the arrangement of the printer system is as follows:

Magnetic drum section 10: $N_A$ is assumed to sense 0.
    Magnetic drum section 11: $M_A$ senses the first number of our pattern, that is 7.
    Printer: Opposite $H_A$ is the first printing line a, and the type character 0, as shown in FIGURE 4a.
    The code marks sensed by the heads $N_A$ and $M_A$ produce signals representing 0 and 7 respectively which are fed to the coincidence device $K_A$.
    Result: There is no coincidence between 0 and 7, thus, $H_A$ will not be actuated.

Time position (2):
    Section 10: $N_A$ senses 1; $N_B$ senses 0.
    Section 11: $M_A$ senses the second number of our pattern, that is 0; the first number 7 is now positioned between $M_A$ and $M_B$.
    Printer: Opposite $H_A$ is the second printing line b, and the type character 1.
    Result: No coincidence between 1 and 0, no hammer actuated.

Time position (3):
    Section 10: $N_A$ senses 2; $N_B$ senses 1; $N_C$ senses 0
    Section 11: $M_A$ senses 3; $M_B$ senses 7; (the first number of our pattern has now reached the next reading head $M_B$).
    Printer:

$H_A \begin{cases} \text{is next to type 2} \\ \text{is next to line c} \end{cases}$ $H_B \begin{cases} \text{is next to type 1} \\ \text{is next to line a} \end{cases}$ Result: No coincidence between 2 and 3 or 1 and 7, no hammer actuated.

Time position (4):
  Section 10: $N_A$ senses 3; $N_B$ senses 2; $N_C$ senses 1; $N_D$ senses 0;
  Section 11: $M_A$ senses 6; $M_B$ senses 0;
  Printer:
  $H_A$ {is next to type 3 / is next to line d
  $H_B$ {is next to type 2 / is next to line b
  Result: No coincidence between 3 and 6 or 2 and 0, no hammer actuated.

Time position (5):
  Section 10: $N_A$ senses 4; $N_B$ senses 3; $N_C$ senses 2; $N_D$ senses 1; $N_E$ senses 0;
  Section 11: $M_A$ senses 2; $M_B$ senses 3; $N_C$ senses 7;
  Printer:
  $H_A$ {is next to type 4 / is next to line e
  $H_B$ {is next to type 3 / is next to line c
  $H_C$ {is next to type 2 / is next to line a
  Result: Coincidence between $N_B$ and $M_B$; therefore the corresponding coincidence device $K_B$ causes hammer $H_B$ to be actuated and to print the type character 3 onto line c of the record sheet.

Reference is now made to the enclosed timing diagram of FIGURES 5a, 5b and 5c which show the printer operation not only for the first five time positions described above but during the whole printing process for our proposed pattern, which will be completely printed during a maximum of forty cycle units. During these forty cycle units the type wheel 6 makes two complete revolutions whereby 20 lines are printed.

For reasons of simplicity, we omit the designations M, N, and H in the timing diagram and define the positioning of the various elements by position letters A through J only.

In FIGURES 5a, 5b and 5c, which are to be taken together as shown in FIGURE 5, there are put down horizontally locations which are defined by the hammer position. Vertically there are put down the time positions. Of each group of three lines belonging to each time position the first line defines the type location with reference to the hammer position, the second line shows the pattern to be printed in its relation to the hammer positions, which may best be derived via their relation to the reading heads M, and the third line indicates the positions of the lines a, b, c, . . . of the record sheet 1 with regard to the hammer locations.

The types 7 (FIGURE 1), represented in FIGURE 5 by the numbers $0^+$, $9^\cdot$, $8^\cdot$, . . . , on account of the higher angular speed of the wheel 6, move from left to right twice as fast as the characters 3, 0, 7, . . . of the pattern and the lines a, b, c, . . . of the record sheet 1. The first occuring coincidence is at time position (5). Coincidence is generally indicated by a circle around the letter designating the record sheet line receiving a print.

The hammers which perform the printing of the twenty lines and the time positions where such printing takes place are the following:

| Line | a | b | c | d | e | f | g | h | i | j |
|---|---|---|---|---|---|---|---|---|---|---|
| at time-position | (15) | (20) | (5) | (10) | (21) | (18) | (25) | (14) | (9) | (16) |
| by hammer | H | J | B | D | I | G | J | D | A | D |

| Line | k | l | m | n | o | p | q | r | s | t |
|---|---|---|---|---|---|---|---|---|---|---|
| at time-position | (11) | (12) | (31) | (22) | (25) | (16) | (35) | (30) | (35) | (30) |
| by hammer | A | A | J | E | F | A | J | G | I | F |

Figure 6:
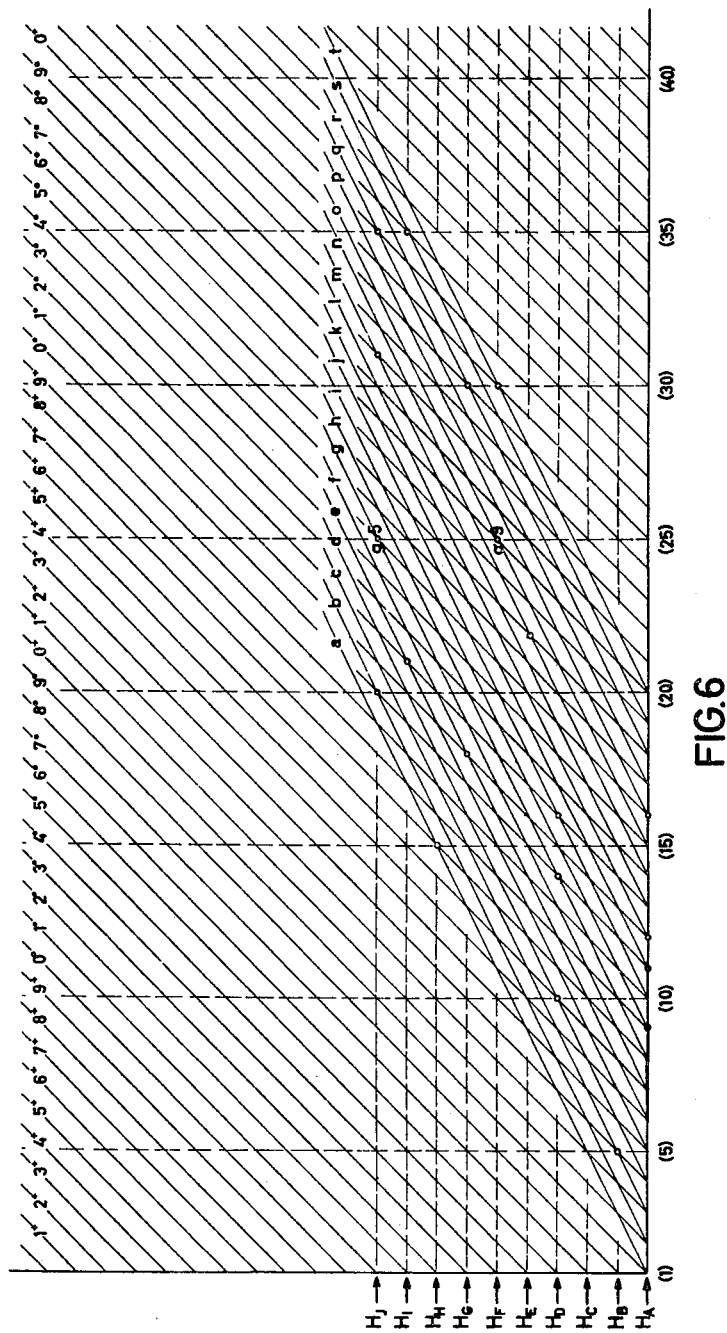

According to the diagram of FIGURE 6, there are plotted along the abscissa the time elements and along the ordinate the hammer positions. The movement of the record sheet 1 (in FIGURES 1 and 4) is represented by the lines a, b, c, . . . and the movement of the types 7 (in FIGURE 1) is represented by the lines $9^+$, $0^\cdot$, $1^\cdot$, $2^\cdot$. . . . In accordance with the fact that the rotational speed of the types is twice the rotational speed of the feeding drums 2 (of FIGURE 1), the lines $9^+$, $1^\cdot$, $2^\cdot$, . . . are twice as steep as are the lines a, b, c. . . . The relation between the hammers and the time positions where actuation of the hammers takes place can easily be seen to be as follows:

| Time position: | (5) | (9) | (10) | (11) | (12) | (14) | (15) | (16) |
|---|---|---|---|---|---|---|---|---|
| Hammer: | B | A X | D | A | A | D | H | A, D |

| Time position: | (18) | (20) | (21) | (22) | (25) | (30) | (31) | (35) |
|---|---|---|---|---|---|---|---|---|
| Hammer: | G | J | I | E | F, J | F, G | J | I, J |

Referring to FIGURE 7, which comprises FIGURES 7a and 7b as shown, represents a schematic view of another embodiment of a high-speed printer. A plurality of print types are simultaneously advanced and carry chains 21 which are driven in the direction as indicated by the arrow by means of wheels 22 fixed to driving shafts 23. Adjacent to these type chains 21 there are provided a plurality of individually operable hammers H, such hammers H being employed in as many lines as there are provided type chains 21. The hammers H cooperate with the type characters during the printing process. The record paper 24, which is continuously fed upwards, moves between the type chains 21 and the hammers H. A ribbon, not shown in FIGURE 7a, will usually be placed between the types 21 and the record paper 24. A platen 25 is provided to form a backing to stop the movement of the striking hammers. It is positioned on the other side of the type characters 21 than are the hammers H.

The movable type chains 21 comprises the characters or symbols to be printed in the form of extending print types. Each chain or line contains several sets of the total number of different characters provided. All chains contain the print types in the same consecutive order and arranged such that each column contains one kind of types only.

The use of type chains instead of a type wheel means that the record paper 24 does not have to be arranged partially surrounding the periphery of the type wheels as this is the case in the foregoing example, but can be advanced in a plane situated between the type chains 21 and the print hammers H.

For better understanding against only the ten numerical symbols or characters 0 through 9 are provided in this example of the printing system. However, the present invention is not limited to this specific case, and it is possible to build alphanumerical or other printers with any desired number of different printing symbols according ot the principle of the invention.

Referring again to FIGURE 7a, the number of type chains is equal to the number of different kind of print characters provided, and for each print character there is provided a corresponding hammer. Thus, in our case, for the ten different numerical characters 0 through 9 there are ten lines of type chains and ten lines of related hammer sets. These lines shall be indexed A through J. In each of the ten hammer sets, there have to be provided as many individually selectable hammers as there are printing positions in a printing line. Generally, this number will be marked with the symbol $v$ and the hammers will be individually marked with $H_A^1$ through $H_A^v$, $H_B^1$ through $H_B^v$ and so forth to $H_J^1$ through $H_J^v$. Altogether 10 times $v$ single hammers are provided. An actuating means L (i.e. a solenoid or the like) belongs to each of these hammers H. The actuating means L are designated with index numbers in the same way as the hammers themselves. They are connected through wires LK to coincidence devices K shown in FIGURE 7b.

Reference is now made to FIGURE 7b. The upper part of this figure gives a schematic view of a magnetic drum 9 which rotates counter-clockwise with a rotational speed in a certain relation to the rotational speed of the type chain moving wheels 2 (FIGURE 1a) as will be outlined later. This magnetic drum is divided into two sections 10 and 11.

The first section 10 contains a plurality of magnetic reference code markings in equidistant spaces along its surface. These magnetic reference code markings are composed of different markings which are indicative of the different print character locations of the type chains. In the printer system as shown, two sets of ten different magnetic reference code markings are provided which correspond to the ten columns of number symbols 0 through 9. The sequence of the magnetic reference code markings on the surface of the magnetic drum section 10 must be the same as the sequence of the print characters of the type chains 21, namely 0 through 9 consecutively.

Ten magnetic reading heads $N^1$ through $N^{10}$ are placed at equal distances across one half the periphery of the magnetic drum section 10. The distance between adjacent reading heads N is equal to the distance between adjacent print character location indications on the magnetic drum section 10.

Generally, there must be at least as many reading heads N as there are different kind of print character columns. If, however, the number of columns of the record sheet 24 is higher than the total number of different kind of print characters, some or all of the reading heads N are related to more than one column of printing. For example, if the number of columns of the record sheet 24 is three times the number of different kind of print characters, then each reading head N is allocated to three columns of the record sheet 24. Should the number of print columns be less than the number of different type characters (which is unusual), then no more reading heads N are necessary than is the number of print columns.

The second section 11 of the magnetic drum contains the information to be printed in the same code as is the code used for the reference code markings or print character location indications of section 10. The information to be printed will be written onto the magnetic drum consecutively line by line by means of a set of magnetic writing heads W. In FIGURE 7b, there are shown the heads $W^1$ and $W^4$. The distance between adjacent information lines of section 11 will be the same as the distance between adjacent reference code markings of section 10. The information passes consecutively line by line ten sets of magnetic reading heads $M_A$ through $M_J$ which heads are placed at equal distances across one half of the periphery of section 11. The distance between two adjacent lines of information reading heads M is the same as the distance between two adjacent character location indication reading heads N.

The single information reading heads M of drum section 11 correspond in a certain way to the print hammers H. Thus, they are marked in accordance with the designations of the single hammers H, for example $M_A^1$ through $M_A^v$, $M_B^1$ through $M_B^v$ and so forth to $M_J^1$ through $M_J^v$. There are as many information reading heads M arranged in one line as there are printing positions provided in one line of hammers H. Generally, we have defined this number with the symbol $v$.

When an information line has passed all ten reading stations $M_A$ through $M_J$, the information will be erased by means of a set of erasing heads E. After erasing, new information can be written by means of writing heads W. It should be noted that correct alignment between the reference code markings of section 10 and the information lines of section 11 is of great importance for a reliable and correct operation of the printer.

Reference is now made to the wiring scheme (FIGURES 7a and 7b). Although, for the sake of simplicity, the wiring scheme is given only for two columns (designated 1 and 4) of printing positions, a complete comprehension of the whole wiring scheme will easily be possible. The magnetic heads M ($M_J^1$ and $M_J^4$) are connected by means of wires MK ($MK_J^1$ and $MK_J^4$) to the first inputs of related coincidence devices K ($K_J^1$ and $K_J^4$), the functioning of which will be explained later. The second inputs of these coincidence devices K are connected through wires NK to the magnetic reading heads N arranged around the magnetic drum section 10 containing print character location indications. The output terminals of the coincidence devices K are connected through wires LK to the related hammer actuating means L. The same index designation as used for the hammer actuating means L and the magnetic heads M, respectively, is also utilized for the coincidence devices K and for the wire connections MK, NK and LK.

It is believed to be obvious in which way the wiring has to be extended for the columns other than the columns 1 and 4 as shown in FIGURES 7a and 7b and therefore these connections are not shown in detail.

The operation of the disclosed printer system will best be understood by also referring to FIGURES 8 and 9, which show operational timing diagrams in graphical form. Also here, for reasons of simplicity, the two column positions 1 and 4 will be discussed only. The ten hammers considered are $H_A^1$ to $H_J^1$ of the first column and the ten hammers of the fourth column designated with $H_A^4$ through $H_J^4$. The magnetic heads which sense the character location indication markings of magnetic drum section 10 are $N^1$ and $N^4$. The magnetic information reading heads of magnetic drum section 11 are $M_A^1$ through $M_J^1$ and $M_A^4$ through $M_J^4$. The printing lines of the record sheet and the information lines of magnetic drum section 11 are designated with a, b, c, etc. The operational cycle units (time position) are again designated with (1), (2), (3), etc. The type characters which pass the print positions in a consecutive order are 0 through 9, lower values first.

We consider in this example that, again, the following number pattern shall be printed in the first as well as in the fourth column. This pattern is related to the information lines of drum section 11 and to the printing lines of the record sheet as follows:

```
Pattern: 4 6 3 5 5 9 7 1 1 0 2 8 0 5 1 2 6 3 0 7
Line:    t s r q p o n m l k j i h g f e d c b a
                    ────────────────────▶
                     Direction of advance
```

The time interval during which the magnetic drum 9 rotates one turn is divided into twenty cycle units (time positions). During one cycle unit, each point of the magnetic drum sections 10 and 11 moves a path length corresponding to the distance between two adjacent reading heads M or N. During one cycle unit, a printing line of the record sheet 24, which is moved continuously upwards, will always reach the next hammer position and again in one cycle unit, each type character of the type chains 1 continuously moves from left to right and will reach the next hammer position. The interconnection of the type chain driving shafts 23 (FIGURE 7a) with the driving means of the record sheet and the magnetic drum respectively (not shown), is determined by this timing schedule.

The graphical timing diagrams FIGS. 8 and 9 give a time sequential presentation of the operation of the whole printer system for the first (FIG. 8) and fourth (FIG. 9) print columns. In both figures, along the abscissa there are plotted the cycle units (time positions), whereas the ordinate represents the positions of magnetic heads $M_A^1$ to $M_J^1$ and N of the hammers $H_A^1$ to $H_J^1$, respectively. The vertical lines represent both the print character indications on drum section 10 and evidently, the type characters. The diagonal lines represent the information lines of drum section 11 and also the printing lines of the record sheet.

To explain the operation of the printer with reference to the representation of FIG. 8, the time position (10) may be considered. At this instant, the type characters 9 are at the location of the hammer $H^1$. At the location of hammer $H_A^1$ is the line j of the record sheet 24, of hammer $H_B^1$ is the line i of the record sheet 24 and so forth and at the location of hammer $H_J^1$ is the line a. Also at this time position (10) the head $M_A^1$ is reading line j of the information drum 11, head $M_B^1$ is reading line i of the information drum 11 and head $M_J^1$ is reading the information line a on the drum 11. Points of intersection of the lines indicate which print character location indications are associated with the various information lines of drum section 11 at distinct time positions. They also indicate which type characters are associated at the particular time positions with the various printing lines of the record sheet. The particular points of intersections at which coincidence occurs between the code markings read by corresponding magnetic heads M and N are marked by small circles. The information pattern is assumed to be the same for the print column 1 as for the print column 4. The cross point markings represented by a small circle also indicated the actuation of the respective hammers by which printing is effected.

The operation of the various parts of the printer during the first four time positions (cycle units) will now be explained in detail with reference to FIGURES 8 and 9.

Time position (1): We suppose that at this time position, the arrangement of the printer system is as follows:

Magnetic drum section 10: $N^1$ reads character location indication marking "0," $N^4$ reads location marking "7."

Magnetic drum section 11: $M_A^1$ reads the first column position of information line "a" which, according to our pattern, contains "7." $M_A^4$ reads the fourth column position of information line "a" which, because the two patterns are assumed to be identical, also contains a "7."

Printer:

Opposite $H_A^1$ is positioned { type character 0, first print position of line "a."

Opposite $H_A^4$ is positioned { type character 7, fourth print position of line "a."

Result: There is no coincidence in column 1; coincidence, however, occurs in column 4 between $N^4$ and $M_A^4$ because both read code marking "7." Thus, hammer $H_A^4$ is actuated which prints type character "7" into the fourth column position of print line "a."

Time position (2):
Drum section 10: $N^1$ reads 1; $N^4$ reads 8;
Drum section 11: $M_A^1$ reads 0; $M_B^1$ reads 7; $M_A^4$ reads 0; $M_B^4$ reads 7;
Printer:
Opposite $H_A^1$ is line b and type 1
Opposite $H_B^1$ is line a and type 1
Opposite $H_A^4$ is line b and type 8
Opposite $H_B^4$ is line a and type 8
Result: There is no coincidence in column 1 and no coincidence in column 4.

Time position (3):
Drum section 10: $N^1$ reads 2; $N^4$ reads 9;
Drum section 11: $M_A^1$ reads 3; $M_B^1$ reads 0; $M_C^1$ reads 7; $M_A^4$ reads 3; $M_B^4$ reads 0; $M_C^4$ reads 7;
Printer:
Opposite $H_A^1$ is type 2 and line c;
Opposite $H_B^1$ is type 2 and line b;
Opposite $H_C^1$ is type 2 and line a;
Opposite $H_A^4$ is type 9 and line c;
Opposite $H_B^4$ is type 9 and line b;
Opposite $H_C^4$ is type 9 and line a;
Result: There is no coincidence in column 1 and no coincidence in column 4.

Time position (4):
Drum section 10: $N^1$ reads 3; $N^4$ reads 0;
Drum section 11: $M_A^1$ reads 6; $M_B^1$ reads 3; $M_C^1$ reads 0; $M_D^1$ reads 7; $M_A^4$ reads 6; $M_B^4$ reads 3; $M_C^4$ reads 0; $M_D^4$ reads 7;
Printer:
Opposite $H_A^1$ is type 3 and line d;
Opposite $H_B^1$ is type 3 and line c;
Opposite $H_C^1$ is type 3 and line b;
Opposite $H_D^1$ is type 3 and line a;
Opposite $H_A^4$ is type 0 and line d;
Opposite $H_B^4$ is type 0 and line c;
Opposite $H_C^4$ is type 0 and line b;
Opposite $H_D^4$ is type 0 and line a;
Result: There is coincidence in column 1 between $N^1$ and $M_B^1$. Thus, hammer $H_B^1$ is actuated and type character "3" is printed into the first column position of print line "c." There is also coincidence in column 4 between $N^4$ and $M_C^4$. Thus, hammer $H_C^4$ is actuated and type character "0" is printed into the fourth column position of print line "b."

The proposed pattern will be completely printed during a maximum of thirty cycle units. During these thirty cycle units, the magnetic drum 9 makes one and a half revolutions whereby all 20 lines are printed.

FIGURE 10 shows an example, according to which the print hammers H of FIGURE 7 are replaced by flashable light sources 33 and the print characters 34 are made of a transparent material built into a movable carrier 32 which is impervious to light. The belt like carrier 32 is driven by the two drums 22 rotatable around their axis 23, respectively. The record sheet 31 is movable in the upward direction as indicated by the arrow and is provided with a light sensitive material on the surface visible in the FIGURE 10. The part of the printer comprising the magnetic drum, the magnetic heads, the coincidence devices and the wiring associated therewith may be identical to the circuit arrangement in FIGURE 7b. The connection of the wires LK is the same as in the example of FIGURE 7, so that the arrangement of FIGURE 7b and FIGURE 10 may be considered to be connected together at the place of the dash-dotted lines. Thus, upon a signal from, for instance, the coincidence device $K_A^1$ a signal is transmitted through the wire $LK_A^1$, which signal operates an actuating device that causes the light source to which it is connected to emit a light flash. This light flash penetrates through the transparent character symbol at the location of the light source and causes the character symbol to be printed on the record sheet 31. The light sensitive surface thereof is for instance a photographic film. In another performance, the record medium may be a carrier of the charge pattern in a xerographic printing process.

The coincidence devices K, as this is mentioned in connection with FIGURE 4b and FIGURE 7b, may be any such device as are known in the art today. By way of example and for the sake of completeness of the description only, such a coincidence circuit will be described in the following, whereby reference is made to FIGURE 11. The coincidence device is shown within the dotted lines. The device has an input NK leading from one of the print character location reading heads N to the wires 101–104, 106–109, and an input MK leading from one of the information reading heads M to the input wires 111–114, 116–119. Wire 101 is connected to rectifier 135, wire 102 is connected to rectifier 131 and so on, and wire 119 is connected to rectifier 122, as shown in FIGURE 11. The direction of low current resistance of the rectifiers 121–136 is the direction of flow into the wires 101 to 104 and 106 to 109, 111 to 114 and 116 to 119. The rectifiers 121 to 136 are connected to the resistors 161 to 168 as follows: Rectifiers 121 and 122 to resistor 168, rectifiers 123 and 124 to resistor 167 and so forth and rectifiers 135 and 136 to resistor 161 as this is shown in the FIGURE 11. The connection between the rectifiers 121 and 122 and resistor 168 is also connected to rectifier 141, the connection of rectifiers 123 and 124 with resistor 167 is also connected to rectifier 142 and so on and the connection of rectifiers 135 and 136 with resistor 161 is also connected to rectifier 148 as shown in the FIGURE 11. The other ends of resistors 161–168 are all connected to the positive terminal of a voltage source 180. The negative poles of the rectifiers 141 and 142 are connected to one side of the resistor 174, the negative terminals of rectifiers 143 and 144 are connected to the one end of the resistor 173, the negative terminals of rectifiers 145 and 146 are connected to one side of resistor 172 and the negative terminals of rectifiers 147 and 148 are connected to the one side of resistor 171. The other ends of resistors 171–174 are connected to the negative pole of the above mentioned voltage source 180. With the negative terminal of rectifiers 150, 151, 152, 153 are connected the connection of rectifiers 141 and 142 with resistor 174, the connection of rectifiers 143 and 144 with resistor 173, the connection of rectifiers 145 and 146 with resistor 172 and the connection of rectifiers 147 and 148 with resistor 171, respectively, the positive poles of the rectifiers 150—153 being connected to the output conductor LK and across the resistor 175 to the positive terminal of the above mentioned voltage source 180. The output conductor LK is connected to one of the activating devices L. Each of the resistors 161–168 is smaller than any of the resistors 171–174.

In operation of the coincidence device according to FIGURE 11, the input wires 101–104, 106–109, 111–114 and 116–119 are normally kept, for example, at −10 volts. Input signals are assumed to be represented by pulses raising the voltage of the respective input wire to +10 volts. The + terminal of the voltage source 180 is assumed to be +20 volts, the − terminal thereof is assumed to be −20 volts. It is further assumed that the signals supplied to the input wires NK and MK into the coincidence device are represented in a binary code. Let it now be assumed that there is supplied the number "4" in the binary form 0100 to the upper input lines 101 to 104 and 111 to 114 which means that a coincidence occurs. Furthermore, the arrangement is assumed to be such that the complement to the binary number, which in this case is 1011, is simultaneously supplied to the wires 106–109 and to the wires 116–119. If a "0" on a wire is represented by the voltage −10 volts and a "1" on a wire is represented by +10 volts, application of the number "4," represented by 0100 and its complement 1011 to the inputs NK and MK produces the following condition:

| Wire 101 | −10 v. | Wire 111 | −10 v. |
| Wire 102 | +10 v. | Wire 112 | +10 v. |
| Wire 103 | −10 v. | Wire 113 | −10 v. |
| Wire 104 | −10 v. | Wire 114 | −10 v. |
| Wire 106 | +10 v. | Wire 116 | +10 v. |
| Wire 107 | −10 v. | Wire 117 | −10 v. |
| Wire 108 | +10 v. | Wire 118 | +10 v. |
| Wire 109 | +10 v. | Wire 119 | +10 v. |

The rectifiers 121–136 are poled such that the −10 volt biases pass easily, so that the positive poles of rectifiers 142, 144, 145 and 148 assume the −10 volt potential. The positive poles (upper poles in the FIGURE 11) of the rectifiers 141, 143, 146 and 147, however, are of a more positive potential, dictated by the current flow from the + pole of the voltage source 180 through the respective resistors 161–168, the respective diodes 141–148 and through the respective resistors 171–174 back to the − pole of the source 180. The rectifiers 141, 143, 146 and 147, pass this more positive potential on to the negative poles of rectifiers 150–153 so that the current from the + terminal of the voltage source 180 through resistor 175 decreases, causing an output pulse to appear on the output conductor LK.

In order to appreciate the conditions when there is no coincidence, it may be assumed that wire 104 is +10 volts and wire 114 still is −10 volts. Then wire 109 is −10 volts and wire 119 is still +10 volts. This means that the positive pole of diode 141 becomes −10 volts, which −10 volts pass unhindered through diode 150 and keep the output LK at the negative potential so that a positive output pulse is prevented to appear at this point.

In the system disclosed in FIGURE 4, the individual types 7 of the type wheel 6 are arranged in one line, whereby a space of one line is provided between consecutive type lines. It is however, possible to distribute the type characters of a line alternately between the same and its consecutive free line so that for each type the immediate surrounding in the upper, lower, right and left direction remain free. In such an embodiment, more room is available for the hammers H and the actuating means L. Adequate repositioning of the print hammers H and the magnetic reading heads M is necessary in such a case. The magnetic heads, 12, 13 and N may remain unchanged.

In the embodiment according to FIGURE 7 and FIGURE 10, the set of movable type chains may be replaced by a rotating type belt.

It should be understood that throughout the present description and claims, the word "print," "printing," or "printer" is not restricted to the process by impressing, but comprises also recording based on the photographic, or the xerographic and the like principle.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A printing apparatus for printing upon a constantly moving record form comprising; a movable type font arranged in columns and rows, the type of any row being identical, and the rows spaced from one another by a predetermined multiple of the desired inter-line space of the record form; a plurality of fixed hammers arranged in columns and rows having the same relative spacing as the said type; means for moving said record form between said type font and said hammers at a predetermined speed; means for moving said type font in the same direction as but at said predetermined multiple of the speed of said form; and timing means for producing a signal to energize any one of said hammers when a given type is aligned with a desired column and line of said record form.

2. In an apparatus for selectively recording character images in columns and rows of a record receiving medium under the control of codal input data; a plurality of normally inoperative character image producing elements arranged in a plurality of sets, there being as many sets as there are different character images to be recorded, each of the elements of any one set being adapted when operative to produce like character images; an elongated character image record receiving medium; a fixed array of instrumentalities each adapted when aligned with any one of said image producing elements to render said one operative to produce a character image upon said record medium; means for continuously moving said elements past said array so as to align with the said instrumentalities thereof successive different patterns of sets of image producing elements; means for continuously moving said record receiving medium past said array and past said elements such that for each successive alignment of image producing elements with said instrumentalities a succession of patterns, consisting of a plurality of rows of record receiving areas of said record receiving medium, are aligned with said instrumentalities and with said successive patterns of elements; and timing means operative responsive to said codal input data to provide operating signals individual to said instrumentalities to render said instrumentalities effective to cause a record image to be made in a column and row of the record medium when the desired element is aligned with the record receiving area.

3. In a printing apparatus for printing in column and rows on a continuously moving record web; a front of type arranged in columns and rows, the type of any one column being identical; a matrix of individually operable type hammers having the same spacing as the columns and rows of type; means for moving said web between said type and said hammers at a predetermined speed and in a direction parallel to the columns of type; means for moving said type at the same predetermined speed in a direction perpendicular to the columns of type; a magnetic recording medium having a character track containing codal bits manifestive of the order of progression of the different type characters in said font; means for moving said magnetic medium at a uniform speed synchronously with the movement of said type and said record form; means for recording in columns and rows upon said magnetic medium codal input data manifestive of the data to be printed in corresponding columns and rows of said record form; a column of sets of magnetic transducers coacting with said character track, there being as many sets thereof as there are columns of hammers; a plurality of sets of transducers arrayed in columns and rows in coaction with said record medium and operative to detect the recorded input data manifestations, there being one set of transducers for each hammer; a matrix of comparing units arranged in columns and rows corresponding to the matrical array of said hammers, each unit being adapted to compare multi-bit character designations, and upon a match thereof to produce an output signal to energize a connected hammer to record a print impression of the type in alignment therewith; means connecting each one of the comparing units with a corresponding one of said sets of data sensing transducers and with a corresponding one of said hammers, and each column of units with one of said sets of character order sensing transducers in seriate correspondence; all of the said transducers being so arranged and disposed with respect to said magnetic medium that the record data and the type character identification indicia are simultaneously sensed and compared in said sensing units connected thereto, whereby any match affects the operation of the hammer associated with the column and row of the matched position to effect printing on the record.

4. An apparatus for printing variable data upon a constantly moving web under the control of codal input data comprising; a drum having a raised font of type on the surface thereof in circumferentially disposed columns and axially extending rows, all of the type in any one row being identical, and the arcuate spacing between rows being twice the desired line spacing of the printing to be effected; a plurality of type hammers arranged in correspondingly spaced columns and rows surrounding a portion of the circumference of said drum and adapted to be individually operated to record an impression of an aligned type; means for feeding the record-receiving web between said drum and said hammers at a predetermined uniform speed; means for rotating said drum at a speed such that the surface speed thereof is twice the speed of transport of the web; a magnetic record medium moved synchronously with the movement of said record form, and having a character track containing codal bits manifestive of the order of the different characters in said type font; means for recording in columns and rows upon said magnetic medium codal bits manifestive of the characters to be printed in corresponding columns and rows of said record form; a plurality of sets of magnetic transducers arranged in columns and rows in coaction with said magnetic media and adapted to sense the codal marks manifestive of the record data, there being one set of heads for each said hammer; a column of sets of magnetic transducers coacting with said character track, there being as many sets of transducers as there are rows of hammers; a plurality of comparing units arranged in columns and rows corresponding to those in which said hammers are arrayed, each unit thereof being adapted to compare two multi-bit character designations, and upon a comparison thereof to produce an output signal to the correspondingly connected hammer; means connecting each of said sets of record data sensing transducers to a corresponding one of said comparing units and each set in said column of transducers with all of the comparing units of a corresponding row; all of the said transducers being so located with respect to said magnetic medium that the data designations corresponding to the columns and rows of the record member in operative alignment with the said hammers are simultaneously presented for detection and comparison in said comparing units with the respective character designations of those type in the font aligned with the corresponding rows of hammers, whereby any compared data and character codal manifestations will produce an operation of the corresponding hammers in the array to effect simultaneous recording of selected characters in input data controlled areas of the record member.

5. In a printing apparatus for recording variable data in columns and rows of a continuously moving data record form in accordance with codal input data; a movable font of type arranged in columns and rows, the type in any one row being identical; a stationary array of individually operable type hammers arranged in columns and rows having the same spacing as said type arrangement; means for continuously moving said record form between said type font and said hammers; means for moving said type font past said hammers at a predetermined multiple of the transport speed of said record form; a magnetic record medium moved synchronously with the movement of said record form, and having a character track containing codal bits manifestive of the order of the different characters in said type font; means for recording in columns and rows upon said magnetic medium codal bits manifestive of the characters to be printed in corresponding columns and rows of said record form; a plurality of sets of magnetic transducers arranged in columns and rows in coaction with said magnetic media and adapted to sense the codal marks manifestive of the record data, there being one set of heads for each said hammer; a column of sets of magnetic transducers coacting with said character track, there being as many sets of transducers as there are rows of hammers; a plurality of comparing units arranged in columns and rows corresponding to those in which said hammers are arrayed, each unit thereof being adapted to compare two multi-bit character designations, and upon a comparison thereof to produce an ouput signal to the correspondingly connected hammer; means connecting each of said sets of record data sensing transducers to a corresponding one of said comparing units and each set in said column of transducers with all of the comparing units of a corresponding row; all of the said transducers being so located with respect to said magnetic medium that the data designations corresponding to the columns and rows of the record member in operative alignment with the said hammers are simultaneously presented for detection and comparison in said comparing units with the respective character designations of those type in the font aligned with the corresponding rows of hammers, whereby any compared data and character codal manifestations will produce an operation of the corresponding hammers in the array to effect simultaneous recording of selected characters in input data controlled areas of the record member.

References Cited in the file of this patent

UNITED STATES PATENTS 2,692,551   Potter ------------------ Oct. 26, 1954

(Other references on following page)

UNITED STATES PATENTS

| | | |
|---|---|---|
| 2,715,360 | Brown | Aug. 16, 1955 |
| 2,726,940 | Buhler | Dec. 13, 1955 |
| 2,757,605 | Dumey | Aug. 7, 1956 |
| 2,776,618 | Hartley | Jan. 8, 1957 |
| 2,825,559 | Davidson | Mar. 4, 1958 |
| 2,858,536 | Johnston | Oct. 28, 1958 |
| 2,873,666 | Stiefel | Feb. 17, 1959 |
| 2,874,634 | Hense | Feb. 24, 1959 |
| 2,918,864 | Devol | Dec. 29, 1959 |

FOREIGN PATENTS

| | | |
|---|---|---|
| 219,406 | Australia | Aug. 21, 1958 |